Figures 1, 2, 3:
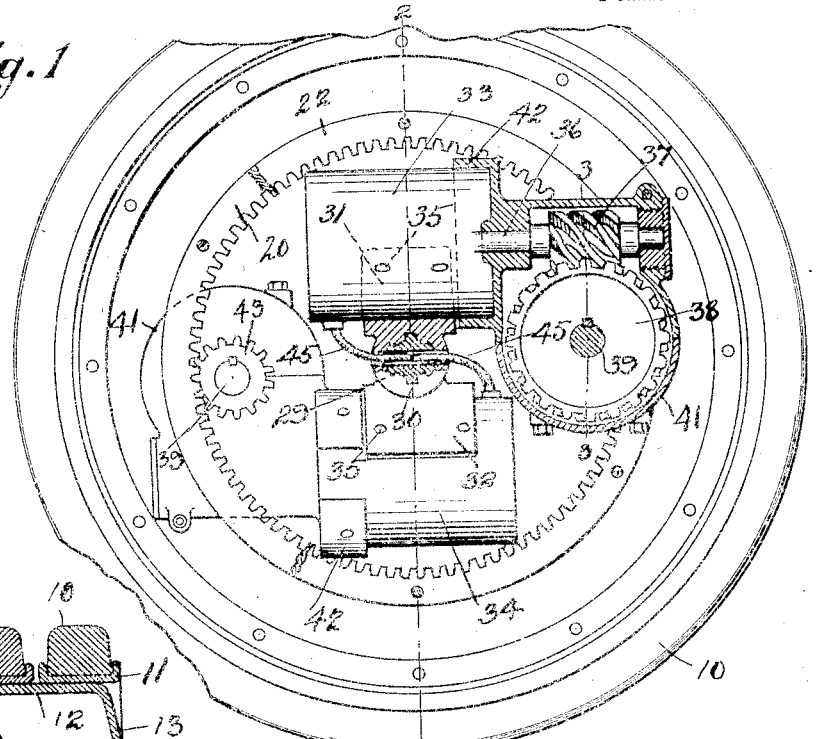

A. H. HOADLEY.
MOTOR DRIVING WHEEL.
APPLICATION FILED MAR. 19, 1915.

1,172,456.

Patented Feb. 22, 1916.
2 SHEETS—SHEET 1.

Witnesses
W. W. Bardsley
A. F. Macready

Inventor
Alfred H. Hoadley.
By Howard E. Barlow
Attorney

A. H. HOADLEY.
MOTOR DRIVING WHEEL.
APPLICATION FILED MAR. 19, 1915.
1,172,456.
Patented Feb. 22, 1916.
2 SHEETS—SHEET 2.
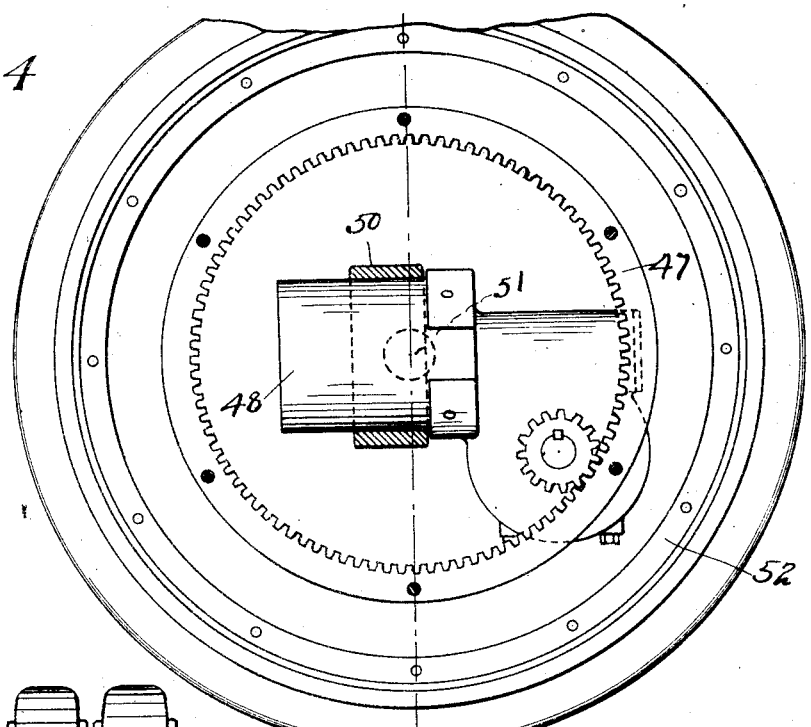
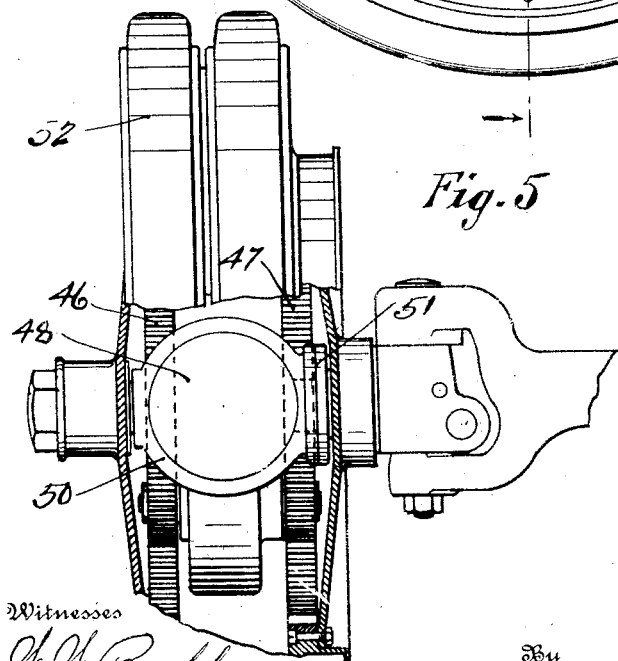
Witnesses
W. W. Bardsley.
A. F. Maccady.
Inventor
Alfred H. Hoadley
By Howard E. Barton
Attorney

UNITED STATES PATENT OFFICE.

ALFRED HENRY HOADLEY, OF PROVIDENCE, RHODE ISLAND.

MOTOR DRIVING-WHEEL.

1,172,456.      Specification of Letters Patent.      Patented Feb. 22, 1916.

Application filed March 19, 1915. Serial No. 15,548.

*To all whom it may concern:*

Be it known that I, ALFRED H. HOADLEY, a citizen of the United States, and resident of the city of Providence, in the county of Providence and State of Rhode Island, have invented certain new and useful Improvements in Motor Driving-Wheels, of which the following is a specification.

This invention relates to motor driving wheels for vehicles of the class having the driving element or elements mounted directly within the wheel itself, and the object of my present invention is to provide an improved arrangement of the driving elements within the wheel and an improved arrangement of driving connections between the elements and the wheel, whereby motors of high speed and high efficiency may be employed and the driving power applied in a practical manner to the wheel.

A further object of this invention is the provision of means whereby a plurality of motors may be located within the wheel and about its axle and operatively connected to rotate the wheel when the motors are energized.

It is found in practice by employing a plurality of motors for obtaining power that I am better enabled to mount the motors within the space limitations. In other words, it is found that higher power and greater efficiency may be obtained in this limited space by the employment of a plurality of high speed motors instead of a single motor of larger size and lower speed.

Another feature of this invention is that by dividing the power applied into separate units that these different units work in a measure independent of each other and therefore are adapted to compensate for any inequality of the connecting mechanisms. Then again by this arrangement the parts are perfectly balanced, both as to structure, the distribution of weight, and also as to the application of power to the different portions of the wheel.

With these and other objects in view, the invention consists of certain novel features of construction, as will be more fully described, and particularly pointed out in the appended claims.

In the accompanying drawings: Figure 1— is a side elevation of the wheel with the front plate removed and a portion of the mechanism shown in section. Fig. 2— is a central sectional elevation on line 2—2 of Fig. 1. Fig. 3— is a section on line 3—3 of Fig. 1 showing the end view of the motor and arrangement of the driving gears connected thereto. Fig. 4— is a side elevation of a wheel with the plate removed showing a modification in which a single motor instead of a plurality of motors is employed for driving the wheel. Fig. 5— is an edge view of the wheel partly broken away showing the mechanism illustrated in Fig. 4.

Referring to the drawings, in my improved self-contained driving wheel 10 designates the tires of the wheel which are mounted on the rims 11 fixed on the body portion 12. On this body portion is a rear plate 13 to which is connected the brake ring 14 within which is mounted an inner cover plate 15 adapted to be removed by unscrewing the nuts 16 from the bolts 17, so as to better get at the parts on the interior of the wheel. The middle portion of this plate serves as a housing for the inner bearing 18 for the stub axle 19. An internal gear or annular rack 20 is also secured by means of the bolts 17 to this rear plate 13. A narrow annular front plate 21 is bolted to the body portion of the wheel, and a second internal gear or annular rack 22 is connected to its inner edge by bolts 23. These bolts also serve to retain the front cap plate 24 whose middle portion 25 receives the outer bearing 26 of the stub axle. The inner end of this stub axle is pivotally mounted to swing on the main axle 27 by the pivot pin 28.

One of the features of the application of the power to my improved driving wheel is the arrangement of the motors therein, whereby two are employed and placed on diametrically opposite sides of the axle. In carrying out this structure I have provided a double saddle member, having a hub 29 formed with a plurality of slots for the reception of the corresponding projections or keys 30 on the axle to positively prevent rotation thereon, and on this member is formed an upper saddle 31 and lower saddle 32, each of a form to receive the body portion of their respective electric motors 33 and 34 which are secured to said saddles by suitable bolts 35. The armature shaft 36 of each motor is provided with a worm 37 which meshes with a worm gear 38; the latter is mounted on a jack shaft 39 which is provided with bearings 40 in the casings 41. These casings are supported by bands 42 connected to the ends of their respective motors 33 and 34. On the opposite ends of each jack shaft are fixed the pinions 43 and 44 which are respectively arranged to engage the teeth of the opposite racks 20 and 22. By this construction, it will be seen that each driving element is a unitary structure, that is the motor, the worm, the worm gear and pinions are arranged in a casing of their own which is connected directly to the motor, itself, so that each motor and its driving mechanism works as a separate and independent unit upon the racks for revolving the wheel and that by this structure the wheel is engaged at four distinct points arranged on diametrically opposite sides of the axle and also on each side of a vertical plane through the center of the wheel, thus equally balancing the distribution of the weight of the parts as well as the points of power application.

The electric energy may be transmitted to the different motors through the cables 45, which are shown in Fig. 2 as entering the stub axle and passing part way through its hollow center portion where it is divided to enter the different motors.

When light power is required, only one of the racks may be used for transmitting the power from a single pinion on the different driving elements. Then again in some cases where very light power is desired, I may employ but one of my unitary driving elements 48 including the motor, worm, worm gear and either one or two pinions and mount this unit in a band 50 on the center of the axle 51, itself, to engage one or both of the racks 46—47 connected to the wheel 52 in the manner illustrated in Figs. 4 and 5.

I have shown and described one arrangement of a pair of motors and mechanism for connecting them to the driving wheel, but I do not wish to be restricted to the employment of the particular number of motors or to the particular arrangement of parts shown as any number of motors may be employed and their position varied without departing from the spirit and scope of my invention, one of the essential features of which is an arrangement of gearing whereby the speed of the motor may be relatively high for driving the wheel.

I claim:

1. A wheel having a plurality of driving motors located within it and offset on opposite sides of the axle, the shafts of both motors being set at right angles to the wheel axle, and means for operatively connecting said motors to rotate said wheel on its axis.

2. A wheel having a plurality of driving elements within it and offset on opposite sides of the axle, the motor shafts being set substantially at right angles to the wheel axle, and means whereby each element is arranged to operate independently upon the wheel to rotate the same on its axle.

3. A wheel having a plurality of motors offset out of line with and on diametrically opposite sides of the axle, the motor shafts being set at right angles to the wheel axle and fixed thereto, and means for operatively connecting said motors to the wheel.

4. A wheel having a plurality of motors located within it and offset from the axis of the wheel axle and a train of gearing positively connecting each of said motors to the wheel.

5. A wheel having a pair of driving motors located within it and means including a worm, a worm wheel and two pinions connecting each motor to the wheel to drive the same.

6. A wheel having a driving motor mounted within it and to one side of its axle center and means including a worm and worm wheel, rack and pinion providing a driving connection between the motor and wheel.

7. A wheel having a driving motor mounted within it and fixed to its axle, a worm on the motor shaft, a rack fixed to the wheel, and a worm gear and pinion mounted on a jack shaft, the former engaging said worm and the latter said rack whereby power is transmitted from the motor to the wheel.

8. A wheel having a driving motor mounted within it and fixed to its axle, a worm on the motor shaft, a pair of racks fixed to the wheel and a worm gear and pair of pinions mounted on a jack shaft, the former engaging said worm and the latter said racks whereby power is transmitted from the motor to the wheel.

9. A wheel having a plurality of motors located within it and on opposite sides of the axle, a pair of pinions driven by each motor one of each pair located on each side of a vertical transverse plane through the wheel and a pair of racks carried by the wheel for engaging said pinions and through which the motor power is transmitted to the wheel.

10. A wheel having a unitary driving element mounted within it, the same comprising a motor, a worm, a worm gear and a pinion, the whole being rigidly supported on the axle, and a rack fixed to the wheel meshing with said pinion whereby the motor power is transmitted to the wheel.

11. A wheel having a plurality of driving elements located on diametrically opposite sides of the axle, each element comprising a motor, a worm on the motor shaft, a worm gear, and a pinion, the whole being supported on the axle and a rack fixed to the wheel meshing with the pinion on the different elements, through which the motor drives the wheel.

12. A wheel having a plurality of driving motors mounted within it and arranged about its axle, a worm on each of the motor shafts, a worm wheel and a pair of pinions mounted on a jack shaft and operated by each motor, and two racks, each for engaging one pinion of each pair through which power is transmitted from the motor to the wheel.

13. A wheel having two driving motors, a saddle member fixed to the central axle and arranged to support said motors on opposite sides of the axle and driving gears for connecting said motors to the wheel at four distinct points.

14. A wheel having two driving motors, a saddle member fixed to the central axle and arranged to support said motors on opposite sides of the axle, two racks on the wheel and a pair of pinions driven by each motor, one of each pair being arranged to engage each rack on diametrically opposite sides of the axle.

In testimony whereof I affix my signature in presence of two witnesses.

ALFRED HENRY HOADLEY.

Witnesses:
W. M. E. WHITE,
JAS. T. RATHBUN.